United States Patent [19]
Karp et al.

[11] Patent Number: 5,689,653
[45] Date of Patent: Nov. 18, 1997

[54] VECTOR MEMORY OPERATIONS

[75] Inventors: Alan H. Karp, Palo Alto; Frederic C. Amerson, Santa Clara; Dennis Brzezinski, Sunnyvale; Rajiv Gupta, Los Altos, all of Calif.; William S. Worley, Jr., Breckenridge, Colo.

[73] Assignee: Hewlett-Packard Company, Palo Alto, Calif.

[21] Appl. No.: 384,308

[22] Filed: Feb. 6, 1995

[51] Int. Cl.$^6$ .............. G06F 9/00; G06F 13/00
[52] U.S. Cl. ............................ 395/250; 395/563
[58] Field of Search .................. 395/250, 800, 395/563

[56] References Cited

U.S. PATENT DOCUMENTS

| | | | |
|---|---|---|---|
| 4,470,115 | 9/1984 | Wehr | 395/250 |
| 4,594,682 | 6/1986 | Drimak | 395/800 |
| 4,788,638 | 11/1988 | Ogawa et al. | 395/250 |
| 4,888,679 | 12/1989 | Fossum et al. | 395/800 |
| 4,910,667 | 3/1990 | Tanaka et al. | 364/200 |
| 5,163,132 | 11/1992 | DuLac et al. | 395/873 |
| 5,379,393 | 1/1995 | Yang | 395/400 |

FOREIGN PATENT DOCUMENTS

| | | | |
|---|---|---|---|
| 0 165 539 A2 | 12/1985 | European Pat. Off. | G06F 15/347 |
| 0 184 828 A2 | 6/1986 | European Pat. Off. | G06F 15/347 |
| 0 363 889 A1 | 4/1990 | European Pat. Off. | G06F 15/347 |
| 0 367 995 A2 | 5/1990 | European Pat. Off. | G06F 15/80 |
| 0 600 165 A1 | 6/1994 | European Pat. Off. | G06F 15/78 |

*Primary Examiner*—David Y. Eng

[57] ABSTRACT

The op-code bandwidth limitation of computer systems is alleviated by providing one or more vector buffers. Data is transferred between memory and processor registers in a two part process using the vector buffers. In a first part, a vector request instruction initiates buffering of data by storing data in control registers identifying a set of data elements (a vector) in the memory. When the identifying information is loaded in the control registers, a vector prefetch controller transfers elements of the vector between the memory and a vector buffer. In a second part, vector element operation instructions transfer a next element of the vector between the vector buffer and a specified processor register for use in arithmetic or logic operations.

20 Claims, 1 Drawing Sheet

VECTOR MEMORY OPERATIONS

FIELD OF THE INVENTION

The present invention relates generally to data transfers with memory in a computer system, and more particularly relates to a computer system utilizing vector memory operations to exchange data with memory.

BACKGROUND AND SUMMARY OF THE INVENTION

A typical computer system now possesses a processor having one or more arithmetic units each capable of performing complex arithmetic operations within a single machine cycle. These operations generally accept two operand values as input, and produce a result value as an output. Further, some computer systems have processors which are capable of performing two arithmetic operations per machine cycle, such as when executing a multiply and add instruction. These multiple-arithmetic operation instructions, however, may require three input operand values and produce a result value. (In practice, programs that use these multiply and add instructions can often be written to use a temporary value stored in a register as one of the input operands, and therefore effectively require only two input operands from memory.)

Although these processors are capable of processing data at a rate requiring an exchange of three or more values with memory per machine cycle, they typically are only capable of issuing a single memory operation per arithmetic unit per cycle. As a result, the processors can perform calculations using these operations at effectively only a third or less of their potential processing speed. The speed at which data can be transferred between a computer system's processor and memory is sometimes referred to as its memory bandwidth. Accordingly, this reduction in the effective processing speed of the system due to an inability to transfer data at a sufficient speed is herein referred to as the "memory bandwidth" problem.

Computer systems having sufficient memory bandwidth to load two values and to store a value each machine cycle may still lag behind their potential processing speed. Present computer systems typically lack any way to express such composite memory operations. In other words, no instruction by which the computer system can be directed to perform two memory load operations plus one memory store operation in a cycle is provided in their instruction set. Accordingly, even if sufficient memory bandwidth is available, these computers also are unable to perform calculations at their full potential processing speed (i.e. with two memory loads/one memory store each cycle). This is referred to as herein as the "op code bandwidth" problem.

A further problem is the latency of a data transfer with main memory. In some computer systems, a request for a word (or like data element) from main memory can take tens of machine cycles to complete. An arithmetic operation requiring a value from memory may be delayed for many machine cycles due to this latency. Such latency problems further slow computer systems from their full potential processing speed.

In some computer systems having vector processors, such as various of the CRAY supercomputers, the CYBER 205, and others, vector instructions can be used to maintain peak processing speed for a number of machine cycles. The vector instructions specify an operation (e.g. memory transfer, arithmetic, logic or other operation) on a set of plural data elements (referred to as a "vector"). Once the instruction is issued, the specified operation continues to execute in subsequent cycles on each element of the vector in succession. An exchange of two data inputs and one data output with memory can be achieved in these computer systems by issuing multiple vector instructions and overlapping their execution. For example, two vector load instructions, a vector arithmetic instruction, and a vector store instruction can be issued with overlapped (or chained) execution so that two input values and an output value for the arithmetic operation are exchanged with memory each cycle. During such overlapped instruction execution, these computer systems are therefore able to attain close to their peak processing performance. (The potential peak processing performance is generally not attained due, in part, to the "overhead" time for issuing the instructions and an initial latency of data exchanges with memory.)

Presently, many computers systems use processors having reduced instruction set computer ("RISC") or very large instruction word ("VLIW") designs. RISC processors are intended to achieve high performance by having a small set of basic instructions which can each be executed quickly (ideally within one machine cycle each). Accordingly, vector instructions of the type used in prior vector processors (which indicate an operation to be executed repeatedly for many consecutive cycles after issuance, and which may be overlapped with other operations) violate the spirit of RISC designs. These types of vector instructions also present problems for instruction scheduling algorithms used in VLIW processor designs. Accordingly, vector operations and vector registers are difficult to integrate into a RISC or VLIW designed processors.

The present invention provides a computer system and method for high bandwidth data exchanges between a memory and a processor. According to the invention, vector memory operations which transfer data in the form of a vector between the memory and the processor comprise two parts. For a first part, one or more vector buffers are provided for buffering the vectors exchanged between the processor and memory. The computer system also provides an instruction set which includes one or more vector request instructions. Responsive to such a vector request instruction, the processor initiates a transfer of data in the form of a vector between the memory and the vector buffers. After initiating the transfer, the processor continues executing instructions in its instruction stream while the vector transfer is continued. Preferably, the transfer is effected by a controller for the vector buffers which operates independently of instruction issue.

For a second part of the vector memory operations, the computer system's instruction set provides instructions for accessing the vectors in the vector buffers element-by-element. Responsive to such an instruction, the processor may transfer a next element of a vector between the vector buffers and the registers in the processor, or use this next element of the vector directly as an operand or result of an arithmetic operation, such as through use of operand bypassing hardware.

In a preferred embodiment of the invention, the computer system provides multiple such vector buffers which are used together effectively to transfer two operands and one result between the processor and memory each machine cycle. With one or more vector request instructions, transfers between the memory and the vector buffers are initiated for two load vectors and a store vector. Subsequent instructions can then effect transfers (one instruction at a time) of next elements of the three vectors between the vector buffers and processor registers. Accordingly, a transfer of two operands and a result is effected to support an arithmetic or logic operation each cycle. This provides sufficient op-code bandwidth for a processor to operate at close to its peak processing speed on vectorizable calculations. Further, by issuing (when possible) the vector request instructions sufficiently prior to the individual, element-by-element operation instructions, the latency to memory can be effectively hidden.

Additional features and advantages of the invention will be made apparent from the following detailed description of a preferred embodiment which proceeds with reference to the accompanying drawings.

DETAILED DESCRIPTION OF THE PREFERRED EMBODIMENTS

Figure 1:
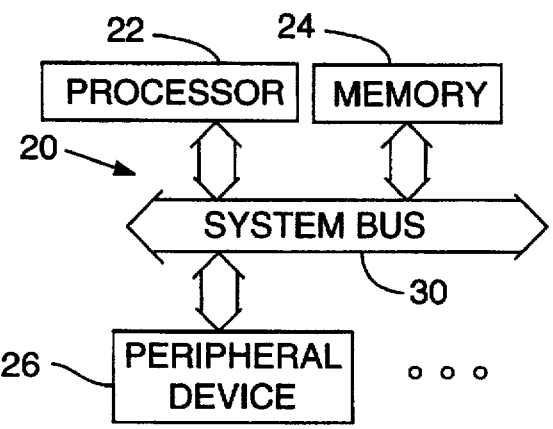
FIG. 1 is a generalized block diagram of a computer system according to first through fifth preferred embodiments of the invention.

With reference to FIG. 1, a computer system 20 according to a first preferred embodiment of the invention comprises a processor 22 which is connected to a memory 24 and peripheral devices 26 with a multiple signal system bus 30. The processor 22 preferably includes a high speed cache memory. The memory 24 preferably is made up of various types of memory, including a primary or main memory (preferably implemented with semiconductor memory chips, e.g. dynamic random access memory ("DRAM") chips or read only memory ("ROM") chips including electrically programmable read only memory ("EPROM")). The memory 24 stores data and instructions for one or more programs that implement a desired task or calculation on the computer system 20. The peripheral devices 26 preferably comprise secondary storage memory devices (such as magnetic or optical data storage devices and the like, including floppy, CD-ROM and hard disk drives), as well as input and output devices for accepting user input and for providing a user understandable output (such as a keyboard, a mouse or other pointer device, a CRT or LCD display, a printer, and the like). The peripheral devices 26 also may include other devices for various purposes, such as communications devices (modems and network adapters), audio and graphics devices, sensing devices, control devices, and many others.

The computer system 20 performs tasks and calculations according to the instructions of one or more programs stored in the memory 24. The processor 22 reads the instructions from the memory and executes corresponding operations. The processor 22 responds to any of a plurality of instructions which form an instruction set of the computer system 20. The instruction set generally includes data transfer instructions, arithmetic instructions, logic instructions, and control instructions. In accordance with the invention, the instruction set also includes one or more vector request instructions for initiating vector transfers with the memory 24. Also in accordance with the invention, the instruction set includes instructions which transfer a next element of the vectors with (i.e. to or from) registers in the processor 22. These instructions are described in more detail below.

Figure 2:
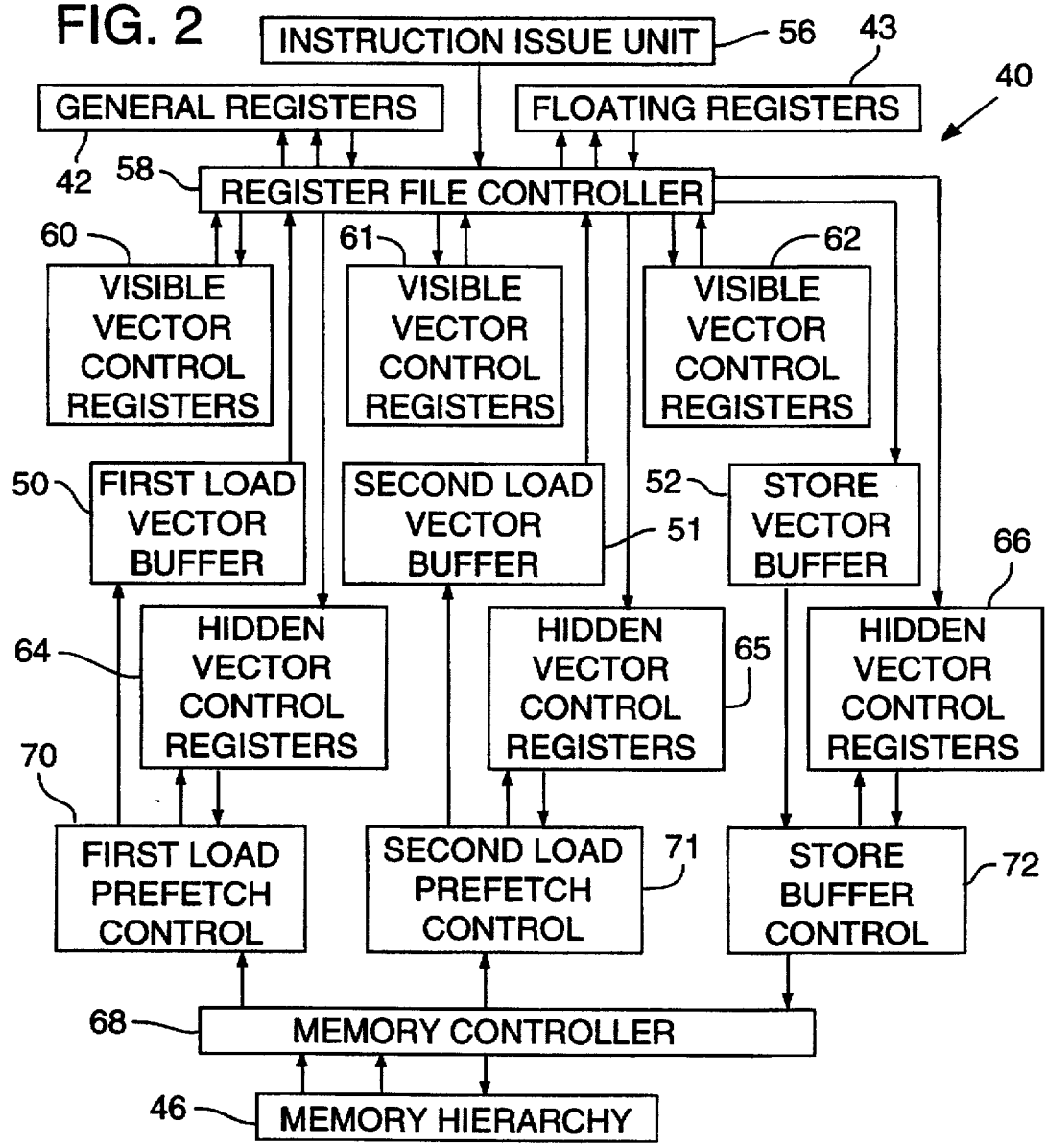
FIG. 2 is a generalized block diagram of a vector prefetch unit in the computer system of FIG. 1.

With reference to FIG. 2, the computer system 20 includes a vector prefetch unit 40 in its processor 22 (FIG. 1) for use in high-bandwidth transfer of data between registers 42-43 of the processor 22 (FIG. 1) and a memory hierarchy 46 according to the invention. The processor registers preferably comprise a set of plural general registers 42 and a set of plural floating-point registers 43. These two sets of registers 42-43 are used primarily to store integer and floating point values, respectively, which are used in arithmetic and logic operations performed by the processor 22. The memory hierarchy 46 preferably includes one or more cache memories in the processor 22, as well as the main and secondary memory devices of the memory 24 (FIG. 1).

The vector prefetch unit 40 achieves high bandwidth data transfers with a two-part vector data transfer process utilizing a set of vector buffers 50-52. In the first preferred embodiment of the invention, the vector prefetch unit 40 comprises three vector buffers, including a first load vector buffer 50, a second load vector buffer 51, and a store vector buffer 52. The vector buffers 50-52 can each store a plurality of data elements. The data elements in the first preferred embodiment are 64-bit double-word values. In alternative embodiments, however, the data elements may be of any size including bits, bytes, words, etc . . . . The load vector buffers 50-51 are used in a vector transfer from the memory hierarchy 46 to the processor registers 42-43, while the store vector buffer 52 is used in a vector transfer of data from the processor registers 42-43 back to the memory hierarchy 46. As explained hereafter, with three vector buffers 50-52 in the vector prefetch unit 40, three data elements can be exchanged with the processor registers 42-43 per cycle, supporting sustained processing with operations requiring three values per cycle. In alternative embodiments of the invention, however, any number of vector buffers may be provided in the vector prefetch unit to support any desired data transfer bandwidth for the processor registers.

In a first part of the vector data transfer process, a vector transfer between a set of data elements in the memory hierarchy 46 (referred to hereafter as a "vector") and the vector buffers 50-52 is initiated. For initiating the vector data transfer, the vector prefetch unit 40 comprises an instruction issue unit 56, a register file controller 58, as well as a set of architecturally visible vector buffer control registers (hereafter "visible control registers") 60-62 and a set of architecturally hidden vector buffer control registers (hereafter "hidden control registers") 64-66 for each of the vector buffers 50-52, respectively. The visible control registers 60-62 form part of a saved state of the processor 22 (FIG. 1) and are instruction addressable. The hidden control registers 64-66 are not externally accessible.

The instruction issue unit 56 decodes instructions of a currently executing program read by the processor 22 (FIG. 1) from the memory 24 (FIG. 1) and issues control signals directing execution of corresponding operations within the processor. Vector data transfers between the memory hierarchy 46 and the vector buffers 50-52 are initiated by the instruction issue unit 56 in response to vector request instructions in the currently executing program. These vector request instructions specify information identifying the vector in the memory hierarchy 46 which is to be the subject of a vector data transfer. Responsive to such instructions, the instruction issue unit 56 directs the register file controller 58 to load the specified identifying information into the visible control registers 60-62 which thereby initiates the vector data transfer.

In some embodiments of the invention, the instruction set of the processor 22 (FIG. 1) may provide specialized instructions for loading the visible control registers 60-62 with the identifying information specified by the instruction. In other embodiments of the invention, the vector request instructions may take the form of a generalized move instruction which is capable of identifying the visible control registers 60–62 as a destination of a data transfer operation involving the identifying information specified by the instruction. In the latter case, the generalized move instruction is considered to be a vector request instruction when it identifies the control registers 60–62 as its destination. The vector request instruction may further take the form of an immediate operation instruction (one in which the operands (i.e. the identifying information) are encoded in the instruction itself), or may be of a form which encodes a location in the general registers 42 or memory hierarchy 46 which either contains the identifying information or a pointer to the identifying information.

The identifying information for the subject vector of a vector transfer preferably comprises an address value, a stride value, a length value, and a mode value. In the first preferred embodiment, the address value is a 64-bit unsigned integer which is the virtual address of a first element of the subject vector in the memory hierarchy 46. The stride value is a 64-bit signed integer which is a number of elements in the memory hierarchy 46 between consecutive data elements in the subject vector. The length value is a 64-bit unsigned integer indicating the number of data elements in the subject vector following the first element. The mode value is an 8-bit, unsigned integer which encodes the type and size of the data elements in the subject vector. (In alternative embodiments of the invention, any arbitrary bit lengths may be used, for these values, such as 16 or 32-bits.) The 8-bit mode value encodes modes for each of the vector buffers in two bits according to the bit assignments listed in the following table 1 (where M[x:y] indicates a range of bit positions in the mode register between bit position numbers x and y).

TABLE 1

| Assignment of Mode Bits to Vector Buffers | |
|---|---|
| Bit Positions | Assigned Vector Buffer |
| M[0:1] | First Load Vector Buffer 50 |
| M[2:3] | Second Load Vector Buffer 51 |
| M[4:5] | Store Vector Buffer 52 |
| M[6:7] | Reserved |

The two bits for each vector buffer encode the data type of the subject vector as listed in the following table 2.

TABLE 2

| Encoding of Data Type by Mode Bits. | | | |
|---|---|---|---|
| Bit 0 | Bit 1 | Type | Size |
| 0 | 0 | Integer | Word |
| 0 | 1 | Integer | Double Word |
| 1 | 0 | Floating Point | Word |
| 1 | 1 | Floating Point | Double Word |

When directed by the instruction issue unit 56 in response to vector request instructions, the register file controller 58 loads the identifying information (i.e. address, stride, length, and mode values) of vectors as specified by the vector request instructions into the visible control registers 60–62. In the first preferred embodiment, the visible control registers 60–62 comprise separate 64-bit address, length, and stride registers for each of the vector buffers 50–52, respectively, and an 8-bit mode register for the three vector buffers, into which the identifying information is loaded. The address and length values loaded in the visible control registers 60–62 are utilized in the second part of the vector data transfer process to transfer data between the vector buffers 50–52 and the processor registers 42–43 as described in more detail below. The address values in the visible control registers 60–62 correspond with the virtual addresses of the next elements to be transferred between the processor registers 42–43 and the respective vector buffer 50–52 (i.e. from the load vector buffers 50–51 to the processor registers 42–43, and from the processor registers 42–43 to the store vector buffer 52), while the length value is the number of elements yet to be transferred. The hidden control registers 64–66 comprise separate 64-bit address and length registers for each of the vector buffers 50–52, respectively. When a non-zero length value is loaded into the visible control registers 60–62 for any of the vector buffers 50–52, the register file controller 58 also copies the address and length values for that vector buffer to its hidden control registers 64–66. These address and length values in the hidden control registers 64–66 are used in transferring data between the vectors in the memory hierarchy 46 and the vector buffers 50–52. The address values in the hidden control registers 64–66 correspond to the physical addresses of the next elements to be transferred between the memory hierarchy 46 and the vector buffers 50–52, respectively, while the length values correspond to the number of elements yet to be transferred. When copied to the hidden control registers 64–66, the address value preferably is translated from a virtual to a physical address of the first element in the vector. The virtual to physical address translation preferably is performed using a page table. A portion of the page table that is currently in use may be stored in a translation look-aside buffer ("TLB") in the processor 22 (FIG. 1). This translated physical address may become invalid if it addresses data on a page which is moved by the operating system (such as when the operating system swaps pages from the main memory 24 to secondary memory devices 26). To ensure that the page is not moved during the vector transfer operation, the page table entry for the page containing the addressed data can be "pinned" (such as by setting a flag indicating to the operating system that the page is not to be moved). Pinning the page table entry also prevents the entry from being moved out of the TLB. In some alternative embodiments, the affected vector buffer can instead be flushed when a page is moved by the operating system to prevent addressing invalid data. To also prevent the prefetch unit from losing access to a page table entry which is moved out of the TLB, the page table entry alternatively can be copied to the hidden control registers 64–66.

For performing the vector data transfer, the vector prefetch unit 40 further comprises a memory controller 68, and a separate vector prefetch controller 70–72 for each of the vector buffers 50–52. The vector prefetch controllers 70–72 and the hidden control registers 64–66 control the transfer of data between the vectors in the memory hierarchy 46 and the vector buffers 50–52. Once the transfer is initiated, the prefetch controllers 70–72 perform the vector data transfer operation to completion independent of further instruction processing by the processor 22 (FIG. 1) (unless the transfer is interrupted such as by an instruction initiating a new vector transfer operation with the buffers).

For the load vector buffers 50–51, the vector prefetch controllers 70–71 begin transferring data from the memory hierarchy 46 to their respective vector buffers when a non-zero length value is copied into their respective hidden control registers 64–65. The prefetch controllers transfer the data from the memory hierarchy 46 by issuing requests for transfer of the next element of their respective vectors to the memory controller 68. (The address value in the prefetch controller's respective hidden control register 64–65 corresponds to the physical address of this next element of the vector.) In response to the request, the memory controller 68 utilizes the most efficient type block transfers available in the computer system 20 to move the requested data element from the memory hierarchy 46. As each requested element is transferred, the prefetch controller 70–71 increments the address value in its respective hidden control register 64–65 by the stride value in the respective visible control register 60–61. The address value then indicates the next element of the respective vector to be transferred. The prefetch controller 70–71 also decrements the length value in its respective hidden control registers 64–65 by one to indicate the number of elements remaining to be transferred. Whenever adequate space is available in the load vector buffers 50–51, the prefetch controllers 70–71 for the load vector buffers 50–51 continue issuing requests for transfer of the next element of the subject vectors until the length values in their respective hidden control registers 64–65 reach zero.

For the store vector buffer 52, the prefetch controller 72 effects transfer of data elements from the store vector buffer to the memory hierarchy 46. Again, the transfer operation is initiated when the hidden control register 66 is loaded with a non-zero length value. However, the prefetch controller 72 begins generating requests for the memory controller 68 to transfer the next element to the memory hierarchy 46 only after data for the transfer has been stored according to the second part of the vector data transfer process (described below) in the store vector buffer 52. The prefetch controller 72 can determine if the store vector buffer 52 contains data to be transferred when the length value in the visible control registers 62 is less than the length value in the hidden control registers 66, or by other suitable means (such as a hardware counter which maintains a count of the number of elements stored in the store vector buffer 52). In response to the request, the memory controller transfers the next element in the store vector buffer 52 to the memory hierarchy 46 at the physical address corresponding to the address value in the hidden control registers 66. As each element is transferred, the prefetch controller 72 increments this address value by the stride value in the visible control registers 62, and also decrements the length value in the hidden control registers 66 by one. Whenever there is data in the store vector buffer 52 to be transferred, the prefetch controller 72 continues issuing requests for the memory controller 68 to transfer the next element to the memory hierarchy 46. Such requests cease when the length value in the hidden control registers 66 is decremented to zero.

When the memory controller 68 is requested by the prefetch controllers 70–72 to transfer (i.e. load or store) an element which is located in the cache of the memory hierarchy 46, the memory controller 68 effects the transfer with the cache rather than the primary memory. As discussed above, when the address value is initially loaded into the hidden control registers 64–66, it is preferably translated into the physical address of the next vector element to be transferred. The address value is again translated into the physical address of the next vector element to be transferred whenever the address value is incremented past a page boundary. Each time the address value is translated, the memory controller 68 preferably checks a bit in a page table entry for the cache to determine if any data in that page of memory has been stored in the cache. If so, the memory controller 68 checks a set of tags for the cache each time a cache line boundary is crossed to determine if the particular element being transferred is stored in a line of data in the cache. If this check reveals that the data is stored in the cache, then the memory controller 68 performs the transfers with the cache. In embodiments of the invention having caches which utilize virtual address tags, the address value in the visible control registers 60–62 which corresponds to the virtual address of the next element to be exchanged with the processor registers 42, 43 can instead be used in performing this check.

A potential problem with consistency can arise if both the buffers 50–52 and the cache memory are allowed to retain copies of the same data and independently modify that data. This could occur, for example, if data is transferred to the load vector buffers 50–51 from the cache memory, and the cache memory retains a copy of the data. A subsequent "scalar" operation instruction which then modifies the copy of the data in the cache memory may result in the vector buffers and cache memory having inconsistent copies. Accordingly, when data is transferred to the vector buffers 50–52 and the cache memory has a copy of data having the same address, the copy of the data in the cache memory is preferably removed from the cache memory. This prevents subsequent instructions from separately modifying the cache memory. The portion of the cache memory which stored the data also is "free" for storing other new data. In alternative, embodiments of the invention, alternative solutions can be used. As a first alternative solution, the vector buffers and cache memory can both store copies of the same data. However, whenever one of the copies is modified, a coherency check (also known as "snooping") is performed to ensure that the other copy also is modified identically. As a another alternative solution, data which is to be used as vector data is marked in the main memory 24 as non-cacheable (such as by a flag, a table, or the like). Such data which is marked as non-cacheable cannot be stored into the cache. Accordingly, when prefetch controllers 70–72 exchange vector data with the memory, no checks need be made to determine if the data is in the cache or to maintain coherency with the cache. As yet another alternative solution, portions of the cache memory are utilized as the vector buffers 50–52 by the vector prefetch unit 40 to perform vector transfers. The mechanisms provided in the cache to ensure its internal coherency thus prevent inconsistent copies of vector transferred data.

In a second part of the vector transfer process, data is transferred between the vector buffers 50–52 and the processor registers 42–43. Transfers between the vector buffers 50–52 and the processor registers 42–43 are performed on an element-by-element basis. Each transfer of an element from one of the vector buffers 50–52 takes place in response to an instruction in the currently executing program. These instructions (hereafter "vector element operation instructions") preferably specify which of the registers in the general or floating-point registers 42–43 are used for the transfer. In the first preferred embodiment, the instructions specify two registers into which the next elements from the load vector buffers 50–51 are transferred, and a register from which the next element of the store vector buffer 52 is transferred. These three registers can be specified within the format of a three operand instruction. Further, in the preferred embodiment, whether the specified register is in the general or floating-point resisters 42, 43 is determined by the mode value stored for the particular vector buffer. More specifically, when the mode value encodes an integer transfer for a vector buffer, the register specified by the instruction for the vector buffer is in the general registers. When the mode value encodes a floating-point transfer for a vector buffer, the instruction-specified register is in the floating-point registers 43. In some alternative embodiments, the instructions may further instruct the processor 22 (FIG. 1) to perform an arithmetic or logic operation on the elements which are exchanged with the vector buffers. Preferably, however, the instructions simply instruct the processor to transfer the elements, and a separate arithmetic or logic operation instruction is used to instruct the processor to perform corresponding operations on the elements after the transfer to the processor registers 42, 43.

Responsive to a vector element operation instruction, the instruction issue unit 56 issues control signals to the register file controller 58 which direct the register file controller to perform the transfer with the registers specified by the instruction. For the load buffers 50–51, the register file controller 58 transfers the next elements of the two load buffers to those registers specified for loading by the instruction. The register file controller 58 also increments the address values in the visible control registers 60–61 by the stride values for the respective load buffers 50–51, and decrements the length values by one. For the store buffer 52, the register file controller 58 transfers the next element from the register specified by the instruction for the store to the store buffer. The register file controller 58 also increments the address value in the visible control register 62 for the store buffer by its stride value, and decrements the length value by one. When the length values in the visible control registers 60–62 for any of the vector buffers 50–52 reaches zero, transfers between that vector buffer and the processor registers 42–43 cease. Any further vector element operation instructions which specify a transfer for that vector buffer are treated as a null operation.

With the above-described vector prefetch unit 40 and two part vector transfer process of the invention, adequate op-code bandwidth is provided to obtain a sustained transfer rate of two operands into and one result out of the processor registers 42–43 each cycle on vectorizable calculations. The currently executing program initiates bulk transfers with memory using one or more vector request instructions which set-up control values in the vector buffer control registers 60–62, 64–66. Thereafter, each subsequent instruction can exchange two operands and a result with the processor registers 42–43 each cycle.

With reference still to FIG. 2, in a second preferred embodiment of the invention, the visible control registers 60–62 are modified to store a mode value which is widened to 16 bits. As in the first preferred embodiment described above, the mode value is stored into the visible control registers 60–62 in response to a vector request instruction. The bits of the mode value preferably are assigned as shown in the following Table 3.

TABLE 3

Assignment of Mode Bits in Second Preferred Embodiment

| Bit Positions | Assignment |
| --- | --- |
| M[0:3] | First Load Vector Buffer 50 |
| M[4:7] | Second Load Vector Buffer 51 |
| M[8:11] | Store Vector Buffer 52 |
| M[12:15] | Prolog Count for Store Vector Buffer 52 |

In the second preferred embodiment, the 4 bits assigned to each vector buffer encode a corresponding mode for the buffer as shown in the following Table 4.

TABLE 4

Encoding of Vector Buffer Modes by Mode Bits

| 0 | 1 | 2 | 3 | Mode |
| --- | --- | --- | --- | --- |
| 0 | 0 | 0 | 0 | Default No-Op, Integer, F-unit, word |
| 0 | 0 | 0 | 1 | Default No-Op, Integer, F-unit, double |
| 0 | 0 | 1 | 0 | Default No-Op, Integer, I-unit, word |
| 0 | 0 | 1 | 1 | Default No-Op, Integer, I-unit, double |
| 0 | 1 | 0 | 0 | Default No-Op, Float, F-unit, word |
| 0 | 1 | 0 | 1 | Default No-Op, Float, F-unit, double |
| 0 | 1 | 1 | 0 | Default No-Op, extended float |
| 0 | 1 | 1 | 1 | Default No-Op, index vector |
| 1 | 0 | 0 | 0 | Default 1, Integer, F-unit, word |
| 1 | 0 | 0 | 1 | Default 1, Integer, F-unit, double |
| 1 | 0 | 1 | 0 | Default 1, Integer, I-unit, word |
| 1 | 0 | 1 | 1 | Default 1, Integer, I-unit, double |
| 1 | 1 | 0 | 0 | Default 1, Float, F-unit, word |
| 1 | 1 | 0 | 1 | Default 1, Float, F-unit, double |
| 1 | 1 | 1 | 0 | Default 1, extended float |
| 1 | 1 | 1 | 1 | Default 1, index vector |

The prolog count in bits 12–15 of the mode value is used to suppress stores at the beginning of software pipelined loops. The prolog count is stored by a vector request instruction in the visible control registers 62 for the store vector buffer 52. When the prolog count is positive, vector element operation instructions will not cause a transfer from the processor register 42–43 to the next element of the store vector buffer 52. Instead, such instructions result only in transfers of next elements of the load vector buffers 50–51 to the processor registers 42–43. The store operation portion of such instructions is treated as a null operation, and the prolog count is decremented by one. When the prolog count reaches zero, normal processing resumes (i.e. subsequent vector element operation instructions result in a transfer to the store vector buffer 52).

The extended mode value also allows the vector request instruction to specify a default action to take in the event that one of the vectors is shorter than another, or when the length of a load or store vector goes to zero because a prolog count is specified. In the second preferred embodiment, one of two default actions can be specified in the mode bits for any of the vector buffers 50–52. One option is to supply a default value to be transferred for the elements of the shorter vector have been exhausted. In the second preferred embodiment, the mode value can encode that a default value of one is to be transferred after that vector's length is exhausted. For example, if the first load vector (buffer 50) is shorter than the other vector buffers (51–52), then the length value in the visible control registers 60 will go to zero before the length values for the vector buffers 51–52. If the mode value for the load vector buffer 50 specifies supplying a default value of one, then a value of one is transferred to the register specified by subsequent vector element operation instructions issued after the length goes to zero. Another option is to leave the register specified by subsequent vector element operation instructions for the exhausted vector buffer unchanged. This is the result when the mode value for a vector buffer is set to any of the "Default No-op" encodings in Table 4 above.

Further encoded in the mode value according to the second preferred embodiment are additional types of data transfers. First, the mode value can encode transfers of integers to the floating-point registers 43 for processing by a floating-point unit (not shown) of the processor 22 (FIG. 1) (indicated in Table 4 by the words "integer" and "F-unit" together). This special type of transfer is particularly useful to trigger an automatic conversion of the integers to a suitable floating-point format when necessary for processing by the floating-point unit (e.g. IEEE 80-bit extended format for floating-point numbers). (Transfers of integers to the general registers and floating-point values to the floating-point registers are indicated in Table 4 by the words "Integer, I-unit" and "Float, F-unit," respectively.)

A second type of transfer encoded in the mode value according to the second embodiment effects transfer of floating-point data elements containing more than 64-bits. To effect such transfers, the two load vector buffers 50–51 are used jointly to load a single one of the floating-point registers 43 per pair of vector data elements. The single floating-point register receives its mantissa from the first load vector buffer 50 and its exponent from the second load vector buffer 51.

Yet another type of data transfer encoded into the mode value is for the transfer of vector indexed data. Such index vector transfers are used to form a contiguous vector out of data scattered throughout the memory hierarchy 46 (hereafter referred to as a "gather" operation). Index vector transfers also are useful in spreading data in a contiguous vector out over the memory hierarchy 46 (hereafter referred to as a "scatter" operation). In the second preferred embodiment, gather operations are performed when the vector request instruction sets a mode value which designates the first load vector buffer 50 as an index vector (mode 0111 or 1111). In such case, the second load vector buffer 51 loads data elements from the memory at addresses indexed by the elements of the first load vector buffer 50 (i.e. gathers discontiguous vector elements), while the store vector buffer 52 stores the loaded elements into a contiguous vector. Scatter operations are performed when the mode value designates the second load vector buffer 51 as an index vector. In that case, the first load vector buffer 50 loads data elements of a contiguous vector which are then stored by the store vector buffer 52 at addresses indexed by the data elements of the second load vector buffer 51 (i.e. scatters contiguous vector elements).

Referring still to FIG. 2, in accordance with a third embodiment of the invention, the vector request instructions can further specify an issue rate of transfer requests to memory. By specifying an issue rate for transfers between the vector buffers 50–52 and the memory hierarchy 46, the rates of inflow and outflow of elements for the vector buffers can be balanced to avoid overflow and empty conditions. For example, if the first load vector buffer 50 becomes full (referred to herein as an "overflow") due to no vector element operation instructions being executed for one or more cycles, the memory controller 68 has to cease issuing requests to transfer a next element of the respective vector with the memory hierarchy 46. If there is a long memory latency (M) and a small buffer capacity (B elements), there can be a delay of M-B cycles if vector element operation instruction are then issued at a rate of one instruction per cycle. (The buffer will be emptied in B cycles. After which there is a delay of M-B cycles before a next element arrives from memory due to latency.) Such delays can be avoided by setting the memory controller to issue memory requests at a same rate at which vector element operations are to be issued by the currently executing program.

In the third embodiment of the invention, the vector request instruction specifies the rate at which the memory controller 68 is to issue transfer requests to the memory hierarchy 46 using the low order bits of the address value. In this embodiment, vector loads are only performed for aligned words or double words. Therefore, these low order address bits are otherwise unused. The issue rate is encoded in these low order address bits as shown in the following Table 5, where A[0:2] indicates the three lowest order bits of the address value specified in the vector request instruction and the issue interval is the number of cycles between transfer requests by the memory controller.

TABLE 5

Encoding of Issue Rate by Low Order Address Bits

| A[0:02] | Issue Interval |
|---------|----------------|
| 000     | 2              |
| 001     | 4              |
| 010     | 6              |
| 011     | 8              |
| 100     | 1              |
| 101     | 3              |
| 110     | 5              |
| 111     | 7              |

With reference still to FIG. 2, in a fourth preferred embodiment of the invention, the vector request instructions can also specify up to three of the processor registers 42–43 for use as vector operands. Preferably, a tag is stored in the visible control registers 60–62 which designates a specific register with which the elements of each of the vector buffers 50–52 is exchanged. Alternatively, the processor registers 42–43 themselves may store a tag designating a particular vector buffer with which data is exchanged. Elements from the load vector buffers 50–51 are then loaded into processor registers 42–43 designated by such a tag whenever an instruction specifies the tag-designated processor registers as sources for operands. Elements are stored to the store vector buffer 52 from its tag-designated processor register whenever an instruction specifies the designated processor register as a target for its result. Such instructions which specify registers designated for vector operands are considered vector element operation instructions according to the invention. With this modification, the invention can reduce the number of instructions needed in a vector calculation, because it is not necessary to use separate instructions to move elements between the vector buffers 50–52 and the processor registers 42–43.

Referring again to FIGS. 1 and 2, according to a fifth preferred embodiment of the invention, a compiler utilized to generate programs for the computer system 20 performs consistency checks to detect conflicts between data transfers by the vector prefetch unit 40. In the vector prefetch unit 40, a plurality of memory transfers are performed each cycle. If more than one of the vector buffers designate vectors in the memory hierarchy having a common element, a conflict between these memory transfers may occur. Preferably, when compiling programs for the computer system 20, the compiler performs consistency checks which are known in the art to detect conflicts between the vectors specified for the vector buffers 50–52. When these checks cannot be done statically (i.e. at compile time) such as for addresses or index vectors which are generated dynamically (i.e. at run time), the compiler generates code (i.e. program instructions) to perform the consistency checks at run time preceding the vector request instructions that initiate the transfers. Additionally, the compiler can perform checks (static or dynamic) for conflicts between vector transfers (using the vector prefetch unit 40) and scalar transfers. Alternatively, specialized hardware can be included in the vector prefetch unit 40 to perform these vector-vector and vector-scalar consistency checks.

Having described and illustrated the principles of our invention with reference to a preferred embodiment, it will be recognized that the preferred embodiment can be modified in arrangement and detail without departing from such principles. For example, for computer systems whose processor includes multiple functional units, a vector prefetch unit for each functional unit can be provided. This allows the functional units to each concurrently perform vector transfers with the memory.

As a further example, the vector prefetch unit 40 can include other numbers of vector buffers. In one alternative embodiment, the store vector buffer can be omitted. In such a case, execution of a vector element operation instruction can be effected by transferring next elements of the two load vector buffers to processor registers specified by the instruction, and storing an element from an instruction-specified processor register directly to memory. In another alternative embodiment, three load vector buffers and a store vector buffer are included in the vector prefetch unit. The vector prefetch unit can then support execution of three operand instructions on vector data. In further alternatives, the vector prefetch unit can include any number of vector buffers.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer system comprising:
   a memory hierarchy including a cache memory and a main memory;
   a register file comprising a plurality of registers;
   a vector buffer for storing a load vector comprising a plurality of data elements obtained from the memory hierarchy and for storing a store vector comprising a plurality data elements for transfer to the memory hierarchy;
   a vector prefetch unit in communication with the memory hierarchy, the register file, and the vector buffer and operative to transfer the data elements of the load vector and the data elements of the store vector between the memory hierarchy and the vector buffer, and between the vector buffer and the register file; and
   an instruction unit in communication with the memory hierarchy and the vector prefetch unit, the instruction unit being operative to read the coded instructions from the memory hierarchy,
   the instruction unit being operative, in response to a vector request instruction specifying the data elements of the load vector and the data elements of the store vector, to cause the vector prefetch unit to transfer the data elements of the load and store vectors between the memory hierarchy and to the vector buffer, and
   the instruction unit being operative, in response to a vector element operation instruction, to cause the vector prefetch unit to transfer a next one of the data elements of the load vector in the vector buffer from the vector buffer to the register file and to transfer a data element contained in the register file from the register file to the vector buffer to provide a next one of the data elements of the store vector while transferring the next one of the data elements from the vector buffer to the register file.

2. The computer system of claim 1 wherein the vector request instruction specifies a transfer rate that controls a rate at which transfer requests are issued to the memory hierarchy during transfer of the data elements of the load and store vectors between the vector buffer and the memory hierarchy, such that the instruction unit is operative, in response to the vector request instruction specifying the transfer rate, to cause the vector prefetch unit to issue transfer requests for the data elements of the load and store vectors in accordance with the transfer rate.

3. The computer system of claim 1 wherein the vector buffer comprises a first load vector buffer for storing a plurality of data elements of a first load vector, a second load vector buffer for storing a plurality of data elements of a second load vector, and a store vector buffer for storing the data elements of the store vector;
   the instruction unit being operative, in response to a vector request instruction specifying the data elements of the first and second load vectors and the data elements of the store vector, to cause the vector prefetch unit to transfer the data elements of the first and second load vectors and the data elements of the store vector between the memory hierarchy to the first and second load and the store vector buffers, respectively.

4. The computer system of claim 3 wherein the instruction unit is operative, in response to a vector element operation instruction specifying a set of registers in the register file for storing a first operand and a second operand and a result, to cause the vector prefetch unit to transfer a next one of the data elements from each of the first and second load vector buffers to the register file to provide the first and second operands and to transfer the result from the register file to the store vector buffer to provide the next one of the data elements of the store vector while transferring the next one of the data elements from the first and second load vector buffers to the register file.

5. The computer system of claim 4 wherein the vector request instruction further specifies a prolog count and wherein the instruction unit is operative, in response to the vector request instruction specifying the prolog count, to cause the vector prefetch unit to suppress transfers between the register file and the store vector buffer while transferring the next one of the data elements and a set of subsequent data elements from each of the first and second load vector buffers to the register file for a number of subsequent vector element operation instructions equal to the prolog count minus one.

6. The computer system of claim 4 wherein the vector request instruction further specifies one of the first or second load vector buffers as containing an index to one of the first or second load vectors such that the instruction unit is operative, in response to the vector request instruction further specifying the index, to cause the vector prefetch unit to transfer the data elements of the first or second load vectors indexed by the index between another of the first and second vector buffers and the memory hierarchy.

7. A computer system comprising:
   a memory hierarchy comprising a cache memory and a main memory for storing a set of coded instructions of a program;
   a vector buffer for storing a load vector comprising a plurality of data elements of the program obtained from the memory hierarchy and for storing a store vector comprising a plurality of data elements of the program for transfer to the memory hierarchy;
   a register file comprising a plurality of processor registers for use in processor operations;
   vector buffer control registers for storing data identifying the data elements of the load vector and the data elements of the store vector;

a vector buffer controller in communication with the vector buffer, the memory hierarchy, the register file, and the vector buffer control registers for controlling transfer of the data elements of the load and store vectors specified in the vector buffer control registers between the memory hierarchy and the vector buffer, and for controlling transfer of the data elements of the load and store vectors consecutively between the vector buffer and the register file; and a processor in communication with the memory hierarchy and the vector buffer controller for retrieving the coded instructions from the memory hierarchy and executing operations corresponding to the coded instructions, the processor being responsive to a vector request instruction specifying the data elements of the load and store vectors to load the vector buffer control registers with the data identifying the data elements of the load and store vectors and to initiate transfer of the data elements of the load and store vectors by the vector buffer controller between the memory hierarchy and the vector buffer, the processor being responsive to a vector element operation instruction to initiate transfer of a next one of the data elements of the load vector in the vector buffer from the vector buffer to the register file and to initiate transfer of a data element contained in the register file from the register file to the vector buffer to provide a next one of the data elements in the store vector such that the next one of the data elements of the load vector is transferred to the register file while the data element is transferred to the vector buffer.

8. The computer system of claim 7 wherein the vector buffer control registers comprise:

a first plurality of vector buffer control registers for identifying the data elements of the load and store vectors and to be transferred between the memory hierarchy and the vector buffer; and a second plurality of vector buffer control registers for identifying the next ones of the data elements of the load and store vectors to be transferred between the vector buffer and the register file.

9. The computer system of claim 8 wherein the vector buffer control registers comprise a register for storing a mode indication that specifies a type and size of the data elements of the load and store vectors to be transferred.

10. The computer system of claim 7 wherein the vector buffer control registers are also for storing data indicating a rate at which transfer requests are to be issued to the memory hierarchy during transfer of the data elements of the load and store vectors between the memory hierarchy and the vector buffer, the processor being responsive to a vector request instruction specifying the rate to set the data in the vector buffer control registers to indicate the rate, and the vector buffer controller operating to issue transfer requests for the data elements of the load and store vectors at the rate specified in the vector buffer control registers.

11. The computer system of claim 7 wherein the vector buffers comprise a first load vector buffer for storing a first load vector comprising a plurality of data elements of the program obtained from the memory hierarchy, a second load vector buffer for storing a second load vector comprising a plurality of data elements of the program obtained from the memory hierarchy, and a store vector buffer for storing the data elements of the program for transfer to the memory hierarchy;

the processor being responsive to a vector element operation instruction specifying a respective processor register in the register file for each of a first and a second operand and a result to initiate transfer of a next one of the data elements from the first and second load vector buffers to the respective processor registers for the first and second operands, and initiate transfer of the result from the respective processor register for the result to a next one of the data elements of the store vector buffer such that the next one of the data elements from the first and second load vector buffers are transferred to respective processor registers while the result is transferred to the store vector buffer.

12. The computer system of claim 11 wherein:

the vector buffer control registers store data identifying the data elements for each of the first load, second load and the store vectors;

the vector buffer controller being in communication with the first load, second load and the store vector buffers, and operating to control transfer of the data elements specified in the vector buffer control registers between the memory hierarchy and the respective first load, second load, and store vector buffers;

the processor being responsive to a vector request instruction specifying for each of the respective first load, second load, and store vector buffers a plurality of data elements in the memory hierarchy to load the vector buffer control registers with the data identifying the data elements for the respective first load, second load, and store vector buffers and to initiate transfer of the data elements by the vector buffer controller between the memory hierarchy and the respective first load, second load, and store vector buffers.

13. The computer system of claim 7 wherein the vector buffer control registers store data indicating one of the processor registers to be associated with the vector buffer, the processor being responsive to a vector element operation instruction specifying an operation on a data element in the one of the processor registers to initiate transfer of the next one of the data elements of the load vector between the vector buffer and the one of the processor registers.

14. A method for performing vector memory operations in a computer system, comprising the steps of:

in response to a vector request instruction specifying an address, a length and a stride for each of a first and a second set of data elements, obtaining the first set of data elements from a memory hierarchy and buffering the first set of data elements obtained from the memory hierarchy as a load vector and transferring the second set of data elements being buffered as a store vector to the memory hierarchy;

in response to each of a plurality of vector element operation instructions specifying a register in a processor register file, transferring a next one of the first set of data elements of the load vector being buffered to the processor register file and transferring a data element out of the processor register file while the next one of the first set of data elements of the load vector being buffered is transferred to the processor register file and buffering the data element from the processor register file as a next one of the second set of data elements of the store vector.

15. The method of claim 14 wherein the vector request instruction specifies an address, a length and a stride for each of a first, a second, and a third group of data, and wherein the steps of obtaining and buffering comprise the step of obtaining the first group of data from the memory hierarchy and buffering the first group of data as a first load vector and obtaining the second group of data from the memory hierarchy and buffering the second group of data as a second load buffer and wherein the step of transferring comprises the step of transferring the third group of data being buffered as the store vector to the memory hierarchy; and in response to each of a plurality of vector element operation instructions each specifying a first, a second, and a third register in the processor register file, the step of transferring a next one of the first set of data elements comprises the step of loading a next data element of the first and second load vectors being buffered to the respective first and second registers and the steps of transferring a data element out of the processor register file and buffering the data element comprise the step of storing a next data element of the store vector being buffered from the third register.

16. The method of claim 15 wherein the vector request instruction further specifies a prolog count, the method further comprising the step of suspending the step of storing the next data element of the store vector being buffered for a number of subsequent vector element operation instructions equal to the prolog count minus one.

17. The method of claim 15 wherein the steps of loading a next data element of the first and second load vectors being buffered and storing a next data element of the store vector being buffered comprise the step of, when the data elements of one but not all of the first load and second load vectors are exhausted, supplying a default value to the register for the respective first load and second load vectors being buffered and that are exhausted.

18. The method of claim 15 further comprising the step of checking for a conflict wherein the vector request instruction specifies a same data element in the memory hierarchy for more than one of the first, second, and third groups of data contained in the memory hierarchy.

19. The method of claim 14 wherein the vector request instruction further specifies a transfer rate that limits a rate at which transfer requests are issued to the memory hierarchy while performing the step of buffering and wherein the step of buffering is performed in accordance with the transfer rate.

20. The method of claim 14 wherein the vector request instruction further specifies one of the first or second groups of data in the memory hierarchy as an index and wherein the step of buffering includes the step of buffering a portion of the first or second groups of data in the memory hierarchy indexed in the memory hierarchy by the index obtained from the memory hierarchy.

* * * * *